(12) United States Patent
Burleigh et al.

(10) Patent No.: US 9,682,628 B2
(45) Date of Patent: Jun. 20, 2017

(54) FUEL VAPOR CANISTER HEATER CONTROL AND DIAGNOSTIC SYSTEMS AND METHODS

(71) Applicant: GM Global Technology Operations LLC, Detroit, MI (US)

(72) Inventors: Darrell W. Burleigh, Fenton, MI (US); Martino Casetti, Clarkston, MI (US); William R. Cadman, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 14/603,536

(22) Filed: Jan. 23, 2015

(65) Prior Publication Data

US 2016/0138528 A1    May 19, 2016

Related U.S. Application Data

(60) Provisional application No. 62/079,603, filed on Nov. 14, 2014.

(51) Int. Cl.
| | |
|---|---|
| *F02M 33/02* | (2006.01) |
| *B60L 7/26* | (2006.01) |
| *F02D 41/00* | (2006.01) |
| *F02M 25/08* | (2006.01) |

(52) U.S. Cl.
CPC ............. *B60L 7/26* (2013.01); *F02D 41/004* (2013.01); *F02M 25/0809* (2013.01); *F02M 2025/0881* (2013.01)

(58) Field of Classification Search
CPC .......... F02D 41/004; F02M 2025/0881; F02M 25/0809

USPC ......................................... 123/518, 519, 520
See application file for complete search history.

(56) References Cited

U.S. PATENT DOCUMENTS

| | | | | |
|---|---|---|---|---|
| 5,245,691 | A * | 9/1993 | Wu ..................... | H05B 1/0222 392/358 |
| 6,083,369 | A * | 7/2000 | Tanigawa ............ | F02D 41/1494 204/424 |
| 6,695,895 | B2 * | 2/2004 | Hyodo ................. | F02M 25/089 123/519 |
| 8,086,355 | B1 * | 12/2011 | Stanczak ............. | H02H 1/0092 323/282 |

(Continued)

FOREIGN PATENT DOCUMENTS

| | | | |
|---|---|---|---|
| DE | 102006026404 A1 * | 12/2007 | |
| JP | EP 2199587 A2 * | 6/2010 | ........... F02D 41/003 |
| WO | WO-2009/080128 A1 | 7/2009 | |

*Primary Examiner* — Marguerite McMahon
*Assistant Examiner* — Tea Holbrook (57) ABSTRACT

An energy module determines an amount of energy consumed by an electric heater of a fuel vapor canister since an ignition system of the vehicle was last transitioned from OFF to ON. A purge valve control module controls opening a purge valve while the ignition system of the vehicle is ON, wherein fuel vapor flows from the vapor canister through the purge valve to an air intake system when the purge valve is open. A heater control module selectively applies power to the electric heater of the fuel vapor canister and, based on at least one of the amount of energy consumed by the electric heater and a mass of fuel vapor that has flowed through the purge valve, selectively disconnects the electric heater from the power until after the ignition system is transitioned from ON to OFF.

20 Claims, 7 Drawing Sheets

(56) References Cited

U.S. PATENT DOCUMENTS

| | | | | |
|---|---|---|---|---|
| 9,013,839 B1* | 4/2015 | Vander Laan | ......... | H02H 3/093 361/23 |
| 2002/0162457 A1* | 11/2002 | Hyodo | ................. | F02M 25/089 96/109 |
| 2003/0140901 A1* | 7/2003 | Amano | ................. | F02M 25/08 123/520 |
| 2004/0007196 A1* | 1/2004 | Young | ................. | B60H 1/2206 123/142.5 R |
| 2004/0180447 A1* | 9/2004 | Ament | ............. | G01N 33/2829 436/137 |
| 2006/0247843 A1* | 11/2006 | Lewis | ................. | F02D 41/1495 701/114 |
| 2008/0155384 A1* | 6/2008 | Golub | ................. | H04L 1/0061 714/798 |
| 2010/0141153 A1* | 6/2010 | Recker | ................. | H05B 33/0803 315/149 |
| 2010/0154755 A1* | 6/2010 | Ichikawa | ............. | F02D 41/003 123/519 |
| 2011/0080159 A1 | 4/2011 | Freter et al. | | |
| 2012/0222656 A1* | 9/2012 | Makino | ............. | B01D 53/0438 123/519 |
| 2013/0133629 A1* | 5/2013 | Ogita | ..................... | F02M 25/08 123/519 |
| 2013/0173186 A1* | 7/2013 | Lim | ........................ | G06F 17/00 702/58 |
| 2013/0211650 A1* | 8/2013 | Tashiro | ................. | B60W 10/06 701/22 |
| 2015/0090233 A1* | 4/2015 | Dudar | ................. | F02M 25/0854 123/520 |
| 2015/0120110 A1* | 4/2015 | Yang | ........................ | B60K 6/20 701/22 |
| 2015/0219045 A1* | 8/2015 | Aso | .................... | F02M 37/0082 123/495 |
| 2015/0267671 A1* | 9/2015 | Kabasin | ................. | F02M 53/02 219/494 |
| 2016/0046174 A1* | 2/2016 | Sagou | ................. | H05B 1/0236 392/375 |
| 2016/0068121 A1* | 3/2016 | Maini | .................... | B60R 16/03 307/10.1 |
| 2016/0076490 A1* | 3/2016 | Makino | ................. | F02M 25/089 123/519 |
| 2016/0186633 A1* | 6/2016 | Muller | .................. | F01N 3/2066 60/295 |

* cited by examiner

FUEL VAPOR CANISTER HEATER CONTROL AND DIAGNOSTIC SYSTEMS AND METHODS

CROSS-REFERENCE TO RELATED APPLICATIONS

This application claims the benefit of U.S. Provisional Application No. 62/079,603, filed on Nov. 14, 2014. The disclosure of the above application is incorporated herein by reference in its entirety.

FIELD

The present disclosure relates to internal combustion engines and more particularly to systems and methods for controlling and diagnosing an electric heater of a fuel vapor canister.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. A vapor purge system provides the engine with fuel vapor drawn from a vapor canister.

Liquid fuel is stored within the fuel tank. In some circumstances, the liquid fuel may vaporize and form fuel vapor. The vapor canister traps and stores the fuel vapor. The purge system includes a purge valve. Operation of the engine causes a vacuum (low pressure relative to atmospheric pressure) to form within an intake manifold of the engine. The vacuum within the intake manifold and selective actuation of the purge valve allows the fuel vapor to be drawn into the intake manifold and purge the fuel vapor from the vapor canister.

SUMMARY

An energy module determines an amount of energy consumed by an electric heater of a fuel vapor canister since an ignition system of the vehicle was last transitioned from OFF to ON. A purge valve control module controls opening a purge valve while the ignition system of the vehicle is ON, wherein fuel vapor flows from the vapor canister through the purge valve to an air intake system when the purge valve is open. A heater control module selectively applies power to the electric heater of the fuel vapor canister and, based on at least one of the amount of energy consumed by the electric heater and a mass of fuel vapor that has flowed through the purge valve, selectively disconnects the electric heater from the power until after the ignition system is transitioned from ON to OFF.

In further features, when the amount of energy consumed by the electric heater is greater than a predetermined amount of energy, the heater control module disconnects the electric heater from the power until after the ignition system is transitioned from ON to OFF.

In further features, when the mass of fuel vapor that has flowed through the purge valve is greater than a predetermined mass, the heater control module disconnects the electric heater from the power until after the ignition system is transitioned from ON to OFF.

In further features, when both the amount of energy consumed by the electric heater is greater than a predetermined amount of energy and the mass of fuel vapor that has flowed through the purge valve is greater than a predetermined mass, the heater control module disconnects the electric heater from the power until after the ignition system is transitioned from ON to OFF.

In further features, the energy module determines the amount of energy consumed by the electric heater based on a voltage applied to the electric heater and a current through the electric heater.

In further features: a conductance module determines an electrical conductance of the electric heater; and a fault module selectively diagnoses a fault in the electric heater based on a maximum value of the electrical conductance determined between a first time when the power is applied to the electric heater and a second time when the power is disconnected from the electric heater.

In further features, the fault module diagnoses the fault in the electric heater when the maximum value of the electrical conductance is one of: greater than a first predetermined conductance; and less than a second predetermined conductance that is less than the first predetermined conductance.

In further features, the fault module diagnoses that the fault is not present in the electric heater when the maximum value of the electrical conductance is both: less than the first predetermined conductance; and greater than the second predetermined conductance.

In further features, a monitoring module illuminates a malfunction indicator lamp when the fault is diagnosed in the electric heater.

In further features, the fault module sets a predetermined diagnostic trouble code (DTC) associated with the fault in memory when the fault is diagnosed in the electric heater.

A heater control method includes: determining an amount of energy consumed by an electric heater of a fuel vapor canister since an ignition system of the vehicle was last transitioned from OFF to ON; controlling opening a purge valve while the ignition system of the vehicle is ON, wherein fuel vapor flows from the vapor canister through the purge valve to an air intake system when the purge valve is open; selectively applying power to the electric heater of the fuel vapor canister; and, based on at least one of the amount of energy consumed by the electric heater and a mass of fuel vapor that has flowed through the purge valve, selectively disconnecting the electric heater from the power until after the ignition system is transitioned from ON to OFF.

In further features, the heater control method further includes, when the amount of energy consumed by the electric heater is greater than a predetermined amount of energy, disconnecting the electric heater from the power until after the ignition system is transitioned from ON to OFF.

In further features, the heater control method further includes, when the mass of fuel vapor that has flowed through the purge valve is greater than a predetermined mass, disconnecting the electric heater from the power until after the ignition system is transitioned from ON to OFF.

In further features, the heater control method further includes, when both the amount of energy consumed by the electric heater is greater than a predetermined amount of energy and the mass of fuel vapor that has flowed through the purge valve is greater than a predetermined mass, disconnecting the electric heater from the power until after the ignition system is transitioned from ON to OFF.

In further features, the heater control method further includes determining the amount of energy consumed by the electric heater based on a voltage applied to the electric heater and a current through the electric heater.

In further features, the heater control method further includes: determining an electrical conductance of the electric heater; and selectively diagnosing a fault in the electric heater based on a maximum value of the electrical conductance determined between a first time when the power is applied to the electric heater and a second time when the power is disconnected from the electric heater.

In further features, the heater control method further includes diagnosing the fault in the electric heater when the maximum value of the electrical conductance is one of: greater than a first predetermined conductance; and less than a second predetermined conductance that is less than the first predetermined conductance.

In further features, the heater control method further includes diagnosing that the fault is not present in the electric heater when the maximum value of the electrical conductance is both: less than the first predetermined conductance; and greater than the second predetermined conductance.

In further features, the heater control method further includes illuminating a malfunction indicator lamp when the fault is diagnosed in the electric heater.

In further features, the heater control method further includes setting a predetermined diagnostic trouble code (DTC) associated with the fault in memory when the fault is diagnosed in the electric heater.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A fuel system includes a vapor canister. The canister includes one or more substances, such as an active charcoal, that traps and stores fuel vapor. A purge valve is selectively opened to purge the fuel vapor from the vapor canister to an internal combustion engine. Vacuum within an air intake system may be used to draw fuel vapor through the purge valve. Fuel vapor flow may be slow, however, when the pressure within the air intake system is near ambient pressure. Fuel vapor flow may also be slow when a temperature of the canister is low because the vapor canister may release fuel vapor at a slower rate due to the low temperature.

An electric heater may be implemented with the vapor canister. The electric heater may be turned on to increase fuel vapor desorption from the vapor canister and, therefore enable faster fuel vapor flow to the air intake system. However, a torque load is applied to the engine in order to generate the electrical power consumed by the electric heater. Therefore, use of the electric heater decreases fuel efficiency.

A heater control module according to the present disclosure monitors an amount of energy consumed by the electric heater and a mass of fuel vapor that has been purged from the vapor canister since an ignition system of the vehicle was turned ON. When the amount of energy and the mass of fuel vapor are greater than respective predetermined values, the heater control module turns the electric heater OFF and maintains the electric heater OFF until after the ignition system is next turned OFF. This balances the interest of purging fuel vapor from the vapor canister with the fuel efficiency decrease associated with the use of the electric heater. A diagnostic module diagnoses faults in the electric heater based on a conductance of the electric heater, as discussed further below.

Figure 1:
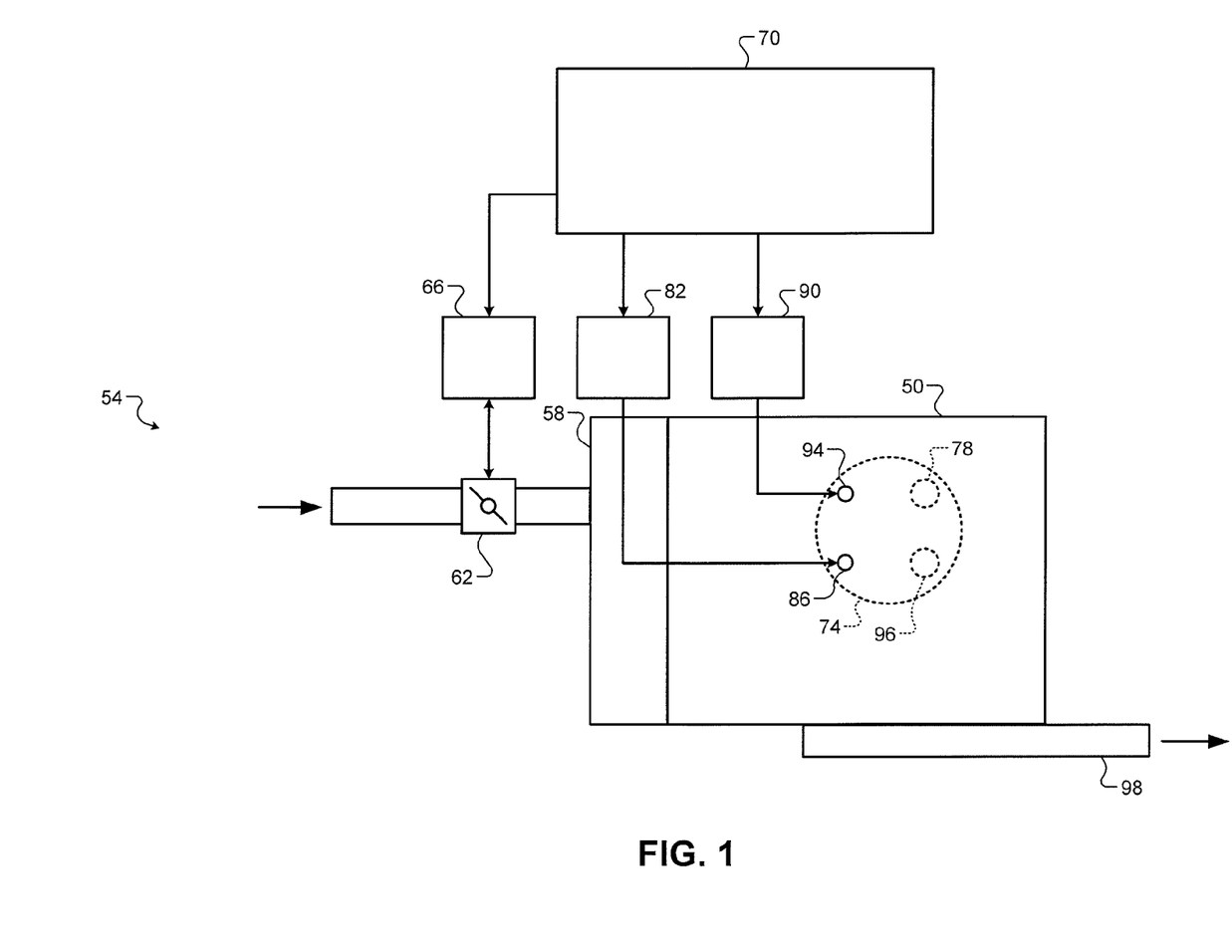
FIG. 1 is a functional block diagram of an example direct injection engine system.

Referring now to FIG. 1, a functional block diagram of an example engine system for a vehicle is presented. An engine 50 combusts an air/fuel mixture to produce drive torque for a vehicle. While the engine 50 will be discussed as a spark ignition direct injection (SIDI) engine, the engine 50 may include another type of engine. One or more electric motors and/or motor generator units (MGUs) may be provided with the engine 50.

Air flows into the engine 50 via an intake system 54. More specifically, air flows into an intake manifold 58 through a throttle valve 62. The throttle valve 62 may vary airflow into the intake manifold 58. For example only, the throttle valve 62 may include a butterfly valve having a rotatable blade. A throttle actuator module 66 (e.g., an electronic throttle controller or ETC) controls opening of the throttle valve 62 based on signals from an engine control module (ECM) 70. In various implementations, the intake system 54 includes one or more boost devices, such as one or more superchargers and/or one or more turbochargers, that increase airflow into the intake manifold 58 and, therefore, the engine 50.

Air from the intake manifold 58 is drawn into cylinders of the engine 50. While the engine 50 may include more than one cylinder, only a single representative cylinder 74 is shown. Air from the intake manifold 58 is drawn into the cylinder 74 through one or more intake valves of the cylinder 74, such an intake valve 78. One or more intake valves may be provided with each cylinder.

A fuel actuator module 82 controls fuel injectors of the engine 50, such as fuel injector 86, based on signals from the ECM 70. A fuel injector may be provided for each cylinder. The fuel injectors inject fuel, such as gasoline, for combustion within the cylinders. The ECM 70 may control fuel injection to achieve a target air/fuel ratio, such as a stoichiometric air/fuel ratio.

The injected fuel mixes with air and creates an air/fuel mixture in the cylinder 74. Based upon a signal from the ECM 70, a spark actuator module 90 may energize a spark plug 94 in the cylinder 74. A spark plug may be provided for each cylinder. Some types of engines, such as diesel engines, do not include spark plugs. Spark generated by the spark plug 94 ignites the air/fuel mixture. Exhaust resulting from combustion is expelled from the cylinder 74 via one or more exhaust valves, such as exhaust valve 96, to an exhaust system 98. One or more exhaust valves may be provided for each cylinder.

Figure 2:
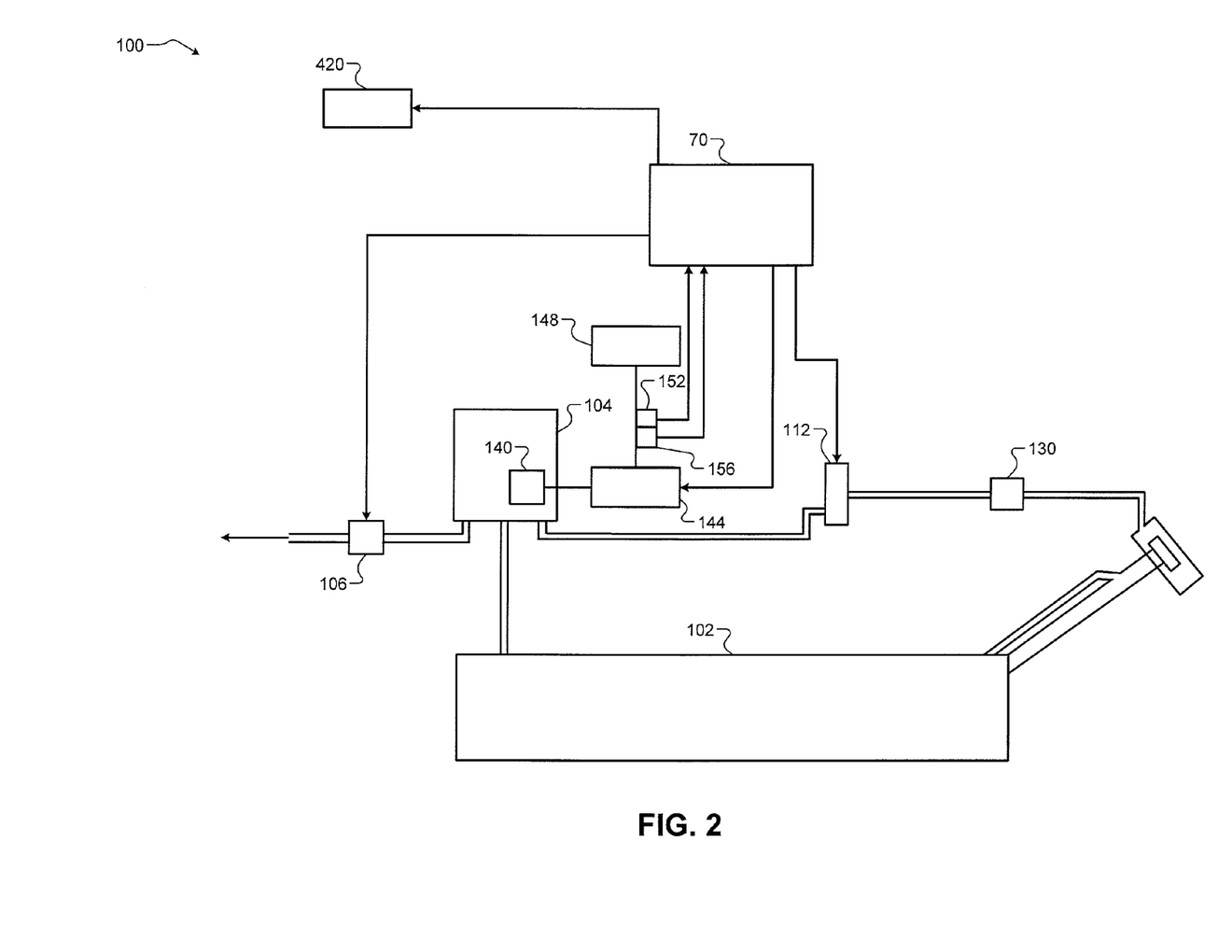
FIG. 2 includes an example fuel system.

Referring now to FIG. 2, a functional block diagram of an example fuel system 100 is presented. The fuel system 100 supplies fuel to the engine 50. More specifically, the fuel system 100 supplies both liquid fuel and fuel vapor to the engine 50. The fuel system 100 includes a fuel tank 102 that contains liquid fuel. Liquid fuel is drawn from the fuel tank 102 and supplied to the fuel injectors of the engine 50 by one or more fuel pumps (not shown).

Some conditions, such as refueling, heat, vibration, and/or radiation, may cause liquid fuel within the fuel tank 102 to vaporize. A vapor canister 104 traps and stores vaporized fuel (fuel vapor). The vapor canister 104 may include one or more substances that trap and store fuel vapor, such as a charcoal. Fuel vapor is absorbed and desorbed based on a temperature of the substance(s). For example, fuel vapor desorption may increase as the temperature decreases, and vice versa.

A purge valve 106 opens and closes to enable and disable, respectively, fuel vapor flow to the engine 50. An example illustration of the purge valve 106 is provided in FIG. 3. Operation of the engine 50 may create a vacuum relative to ambient pressure within the intake manifold 58.

In some instances, such as when one or more boost devices are increasing airflow into the engine 50, pressure within the intake manifold 58 may be greater than or approximately equal to ambient pressure. The pressure within the intake manifold 58 may also approach ambient pressure when the throttle valve 62 is wide open.

The ECM 70 controls the purge valve 106 to control the flow of fuel vapor to the engine 50. The ECM 70 may also control opening and closing a vent valve 112. When the vent valve 112 is open, the ECM 70 may selectively open the purge valve 106 to purge fuel vapor from the vapor canister 104 to the intake system 54.

The ECM 70 may control the rate at which fuel vapor is purged from the vapor canister 104 (a purge rate) by controlling opening and closing of the purge valve 106. For example only, the ECM 70 may control the purge rate, the purge valve 106 may include a solenoid valve, and the ECM 70 may control the purge rate by controlling duty cycle of a signal applied to the purge valve 106. Ambient air flows into the vapor canister 104 as fuel vapor flows from the vapor canister 104 toward the intake system 54.

A driver of the vehicle may add liquid fuel to the fuel tank 102 via a fuel inlet 113. A fuel cap 114 seals the fuel inlet 113. The fuel cap 114 and the fuel inlet 113 may be accessed via a fueling compartment 116. A fuel door 118 may be implemented to shield and close the fueling compartment 116. The ambient air provided to the vapor canister 104 through the vent valve 112 may be drawn from the fueling compartment 116. A filter 130 receives the ambient air and filters various particulate from the ambient air.

The purge valve 106 may be directly coupled to a component of the intake system 54, such as the intake manifold 58 or an intake pipe through which air flows into the intake manifold 58. In engines having a boost device, the purge valve 106 may be directly coupled to a component upstream of the boost device.

An electric heater 140 may warm the vapor canister 104. For example only, the electric heater 140 may be implemented within the vapor canister 104 as shown in FIG. 2. The electric heater 140 may be, for example, a positive temperature coefficient (PTC) device. A switching device 144, such as a field effect transistor (FET) or another suitable type of switching device, controls current flow from a power source 148 to the electric heater 140. For example only, the power source 148 may be a battery of the vehicle. A voltage sensor 152 measures a voltage applied to the electric heater 140. A current sensor 156 measures current flow through the electric heater 140. While the switching device 144, the current sensor 152, and the voltage sensor 156 are shown as being external to the ECM 70, the switching device 144, the current sensor 152, and the voltage sensor 156 may be implemented within the ECM 70 in various implementations. While one example fuel system has been shown and discussed, the present application is also applicable to other types of purge systems, such as dual path purge systems and purge systems including a pump that pumps fuel vapor back to the air intake system.

Figure 3:
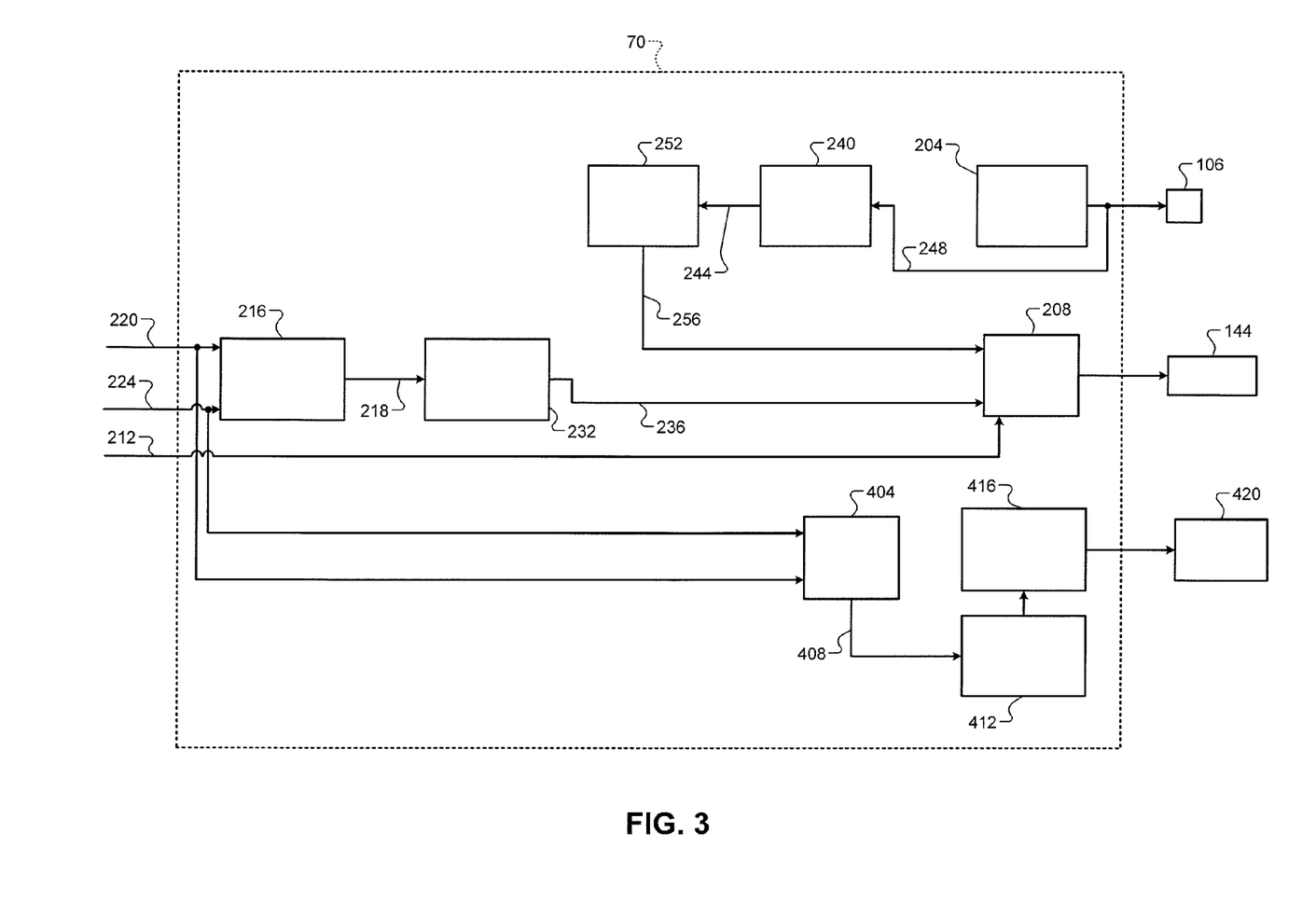
FIG. 3 is a functional block diagram of an example portion of an engine control module.

FIG. 3 is a functional block diagram of an example portion of the ECM 70. A purge valve control module 204 controls the purge valve 106. A heater control module 208 controls the switching device 144 to control whether the electric heater 140 is ON or OFF. The heater control module 208 may close the switching device 144 to turn the electric heater 140 ON after a driver starts the vehicle and one or more other conditions are satisfied. For example, the heater control module 208 may close the switching device 144 once a predetermined period has passed after the ECM 70 begins controlling fueling in closed-loop (based on feedback from one or more oxygen sensors) after the driver starts the vehicle.

A driver of the vehicle may start and shutdown the vehicle using a key, a button, and/or one or more other suitable devices. An ignition signal 212 indicates whether the vehicle is to be ON or OFF based on the driver input. For example, the ignition signal 212 may indicate that the vehicle is to be ON when the driver actuates an ignition key to an ON position. The ignition signal 212 may indicate that the vehicle is to be OFF when the driver actuates the ignition key to the OFF position.

A power module 216 determines an amount of power 218 consumed by the electric heater 140. For example, the power module 216 may determine the amount of power consumed by the electric heater 140 based on a voltage 220 applied to the electric heater 140 and a current 224 flow through the electric heater 140. The power module 216 may set the power 218 consumption of the electric heater 140 equal to the voltage 220 multiplied by the current 224. The voltage 220 may be measured using the voltage sensor 152, and the current 224 may be measured using the current sensor 156.

An energy module 232 determines an energy consumption 236 of the electric heater 140 based on the power 218 consumption. For example, the energy module 232 may determine mathematical integrals of the power 218 over predetermined periods to determine energy consumptions over the respective predetermined periods. The energy module 232 sums the energy consumptions for the predetermined periods to determine the energy consumption 236. The energy module 232 may reset the energy consumption 236 when the driver starts the vehicle. The energy consumption 236 therefore corresponds to the total amount of energy consumed by the electric heater 140.

A purge flowrate module 240 determines a mass flowrate 244 of fuel vapor through the purge valve 106. For example, the purge flowrate module 240 may determine the mass flowrate 244 of fuel vapor through the purge valve 106 based on a mass of fuel vapor within the vapor canister 104, a first pressure at an input side of the purge valve 106, a second pressure at an output side of the purge valve 106, and an opening 248 of the purge valve 106. For example, the purge flowrate module 240 may determine the mass flowrate 244 of fuel vapor through the purge valve 106 using one of a function and a mapping that relates masses of fuel vapor within the vapor canister 104, first pressures, second pressures, and openings of the purge valve 106 to the mass flowrate 244.

The opening 248 of the purge valve 106 may, for example, correspond to the duty cycle of the signals applied to the purge valve 106 or an opening area of the purge valve 106. The first pressure may correspond to a pressure between the vapor canister 104 and the purge valve 106. The first pressure may be measured using a sensor or determined based on one or more other parameters. The second pressure may correspond to a pressure in the intake system where fuel vapor is introduced. The second pressure may be measured using a sensor or determined based on one or more other parameters.

A purge mass module 252 determines a mass of fuel vapor that has been purged from the vapor canister 104 based on the mass flowrate 244 of fuel vapor through the purge valve 106. This mass will be referred to as a purge mass 256. For example, the purge mass module 252 may determine mathematical integrals of the mass flowrate 244 over predetermined periods to determine masses of fuel vapor purged from the vapor canister 104 over the respective predetermined periods. The purge mass module 252 sums the masses for the predetermined periods to determine the purge mass 256. The purge mass module 252 may reset the purge mass 256 when the driver starts the vehicle or when the energy module 232 resets the energy consumption 236. The purge mass 256 therefore corresponds to the total mass of fuel vapor purged from the vapor canister 104. While the example of using the purge mass 256 is provided, the mass of air input to the vapor canister 104 could also be used.

The heater control module 208 selectively opens the switching device 144 and turns OFF the electric heater 140 based on the purge mass 256 and the energy consumption 236. For example, the heater control module 208 opens the switching device 144, thereby disabling current flow to the electric heater 140 and turning the electric heater 140 OFF, when the energy consumption 236 is greater than a predetermined amount of energy and the purge mass 256 is greater than a predetermined mass. The predetermined amount of energy and the predetermined mass may be calibrated values and one or both are greater than zero. The predetermined amount of energy and the predetermined mass may be calibrated, for example, to balance the interest of purging fuel vapor from the vapor canister 104 with the decrease in fuel efficiency associated with use of the electric heater 140.

The heater control module 208 opens the switching device 144 and turns OFF the electric heater 140 for a remainder of the key cycle. In other words, the heater control module 208 opens the switching device 144 and turns OFF the electric heater 140 until the driver later turns the vehicle OFF. The electric heater 140 remains OFF while the vehicle is OFF and, as described above, may be turned ON again after the driver turns the vehicle back ON.

Figure 4:
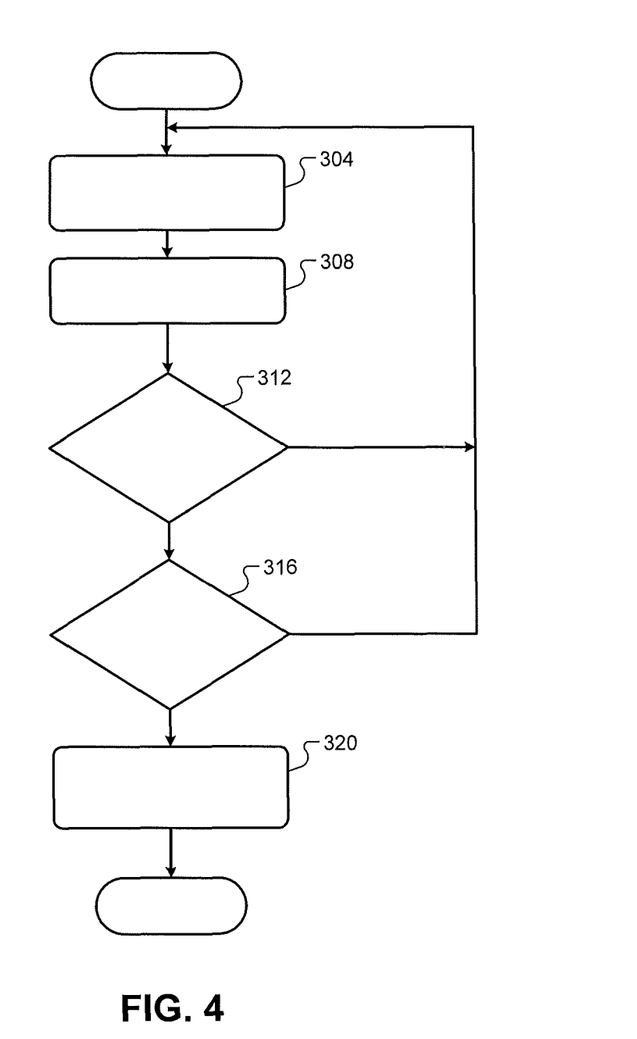
FIG. 4 is a flowchart depicting an example method of selectively disabling an electric heater of a fuel vapor canister.

Referring now to FIG. 4, a flowchart depicting an example method of disabling the electric heater 140 is presented. As described above, the heater control module 208 may close the switching device 144 to turn the electric heater 140 ON after the driver turns the vehicle ON. Control begins at 304 when the vehicle is ON. At 304, the power module 216 determines the power 218 consumed by the electric heater 140 based on the voltage 220 applied to the electric heater 140 and the current 224 through the electric heater 140. The purge flowrate module 240 also determines the mass flowrate 244 of fuel vapor through the purge valve 106 at 304.

At 308, the energy module 232 determines the energy consumption 236 of the electric heater 140, and the purge mass module 252 determines the purge mass 256. For example, the energy module 232 may integrate the power 218 over the period since the energy consumption 236 was last updated and sum the result of the integration with the previous value of the energy consumption 236. The purge mass module 252 may integrate the mass flowrate 244 over the period since the purge mass 256 was last updated and sum the result of the integration with the previous value of the purge mass 256. The energy module 232 may be enabled or disabled, so the energy consumption 236 may include or exclude energy consumed during a fault diagnostic of the electric heater 140.

The heater control module 208 determines whether the energy consumption 236 of the electric heater 140 is greater than the predetermined amount of energy at 312. If 312 is true, control continues with 316. If 312 is false, control returns to 304 to continue updating the energy consumption 236 and the purge mass 256.

At 316, the heater control module 208 determines whether the purge mass 256 is greater than the predetermined mass. If 316 is true, control continues with 318. If 316 is false, control returns to 304 to continue updating the energy consumption 236 and the purge mass 256. At 318, the heater control module 208 determines whether a fault diagnostic of the electric heater 140 is being performed and is not yet complete. If 318 is true, control may return to 304. In this manner, performance of the fault diagnostic may be allowed to continue. If 318 is false, control may continue with 320. In various implementations, control may open the switching device 144 if a fault is diagnosed in the electric heater 140.

At 320, the heater control module 208 opens the switching device 144, disabling current flow to the electric heater 140, and turning the electric heater 140 OFF. The heater control module 208 maintains the switching device 144 open and maintains the electric heater 140 OFF until after the driver next turns the vehicle OFF.

Referring back to FIG. 3, a diagnostic module 404 selectively diagnoses the presence of a fault in the electric heater 140. When the fault is present in the electric heater 140, the diagnostic module 404 stores a predetermined diagnostic trouble code (DTC) 408 in memory 412. The predetermined DTC indicates that the fault is present in the electric heater 140. A monitoring module 416 monitors the memory 412 and illuminates a malfunction indicator lamp (MIL) 420 when the fault is present in the electric heater 140.

The MIL 420 may, for example, indicate that it may be appropriate to seek servicing for the vehicle. Upon servicing the vehicle, a vehicle service technician may access the memory 412. The predetermined DTC may serve to indicate to the vehicle service technician that a fault is present in the electric heater 140. One or more other remedial actions may also be taken when a fault is present in the electric heater 140. For example, the electric heater 140 may be maintained OFF.

Figure 5:
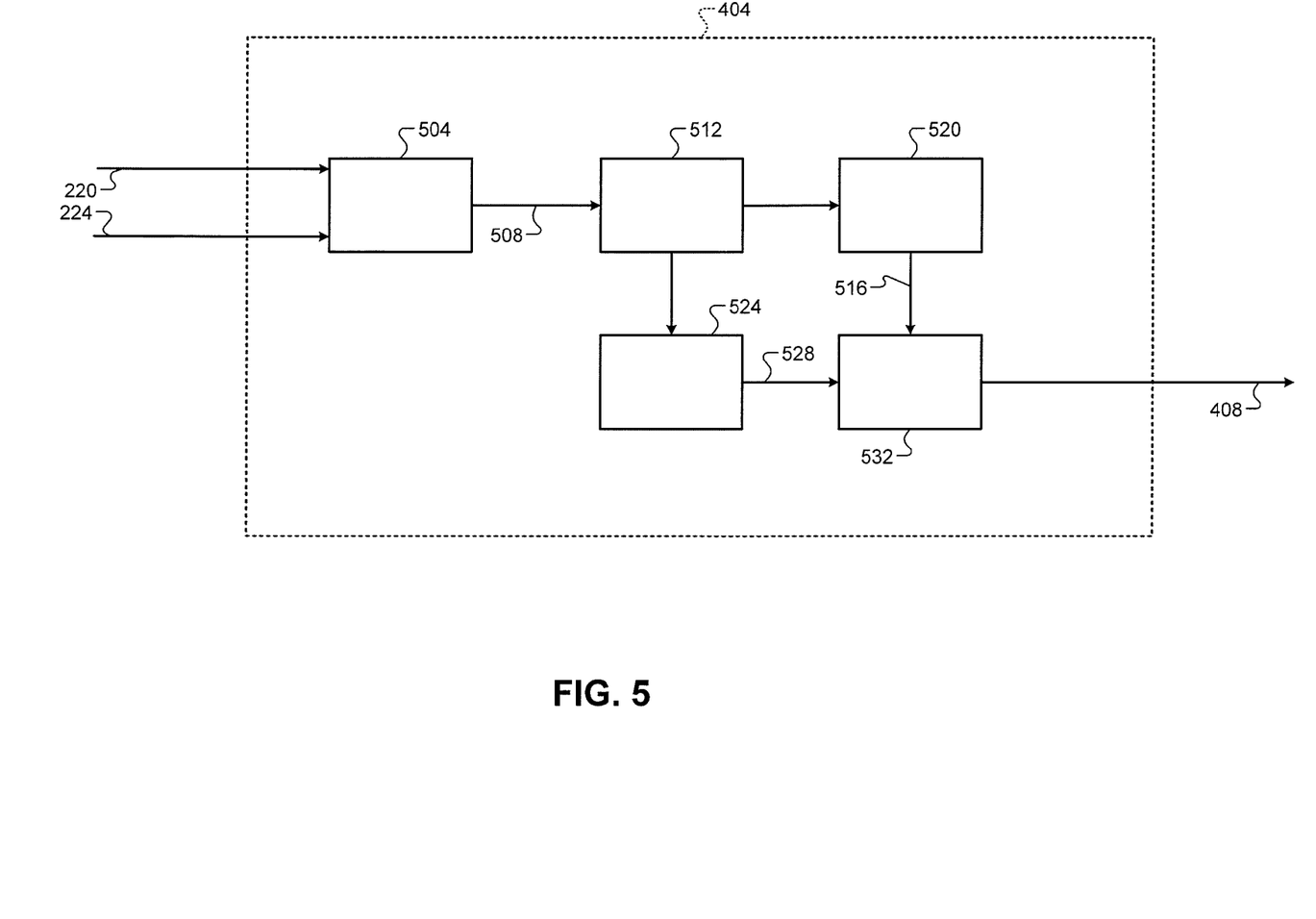
FIG. 5 is a functional block diagram of an example diagnostic module.

FIG. 5 is a functional block diagram of an example implementation of the diagnostic module 404. Referring now to FIG. 5, a conductance module 504 determines a conductance (electrical) 508 of the electric heater 140 based on the voltage 220 applied to the electric heater 140 and the current 224 through the electric heater 140. For example, the conductance module 504 may set the conductance 508 equal to the current 224 divided by the voltage 220.

Figure 7:
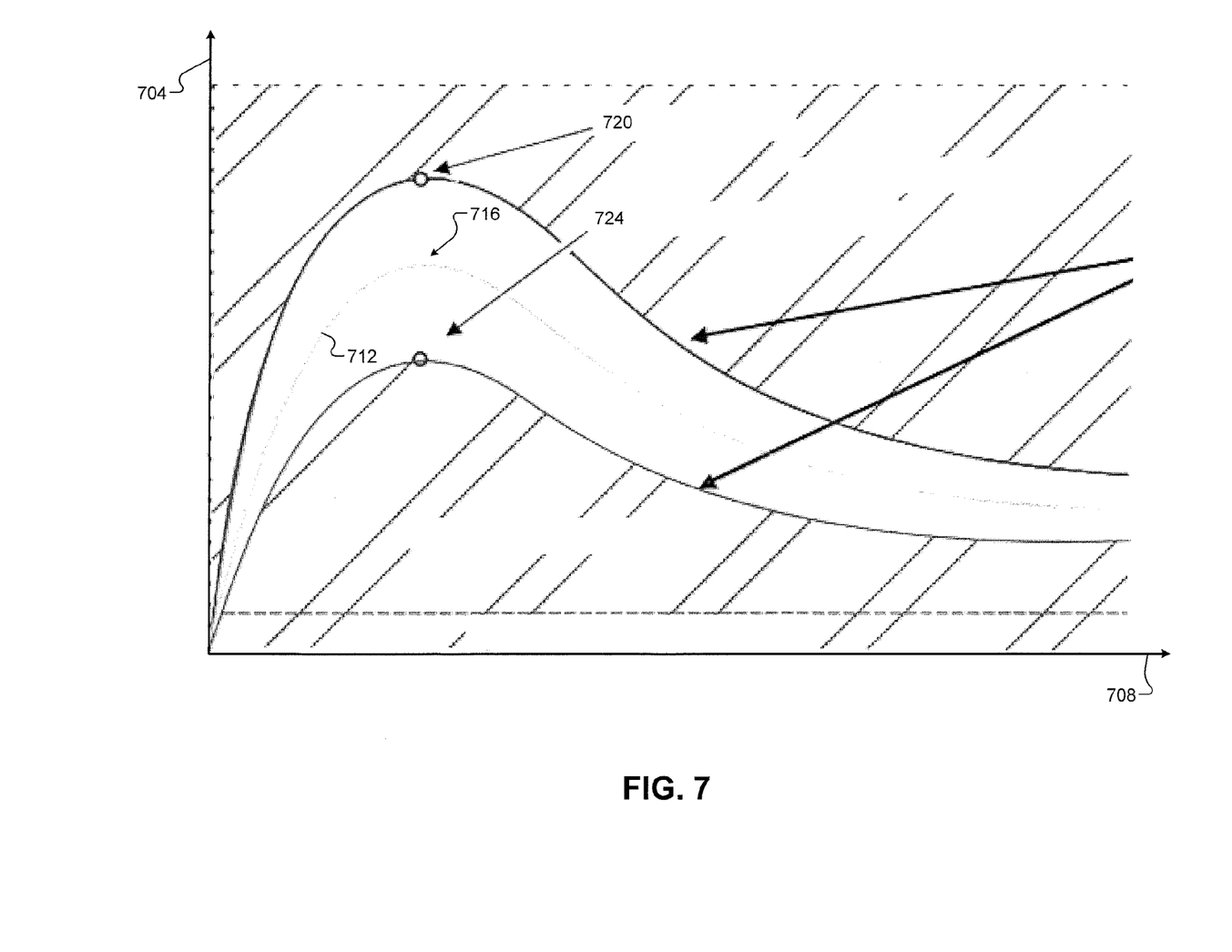
FIG. 7 includes an example graph of conductance of an electric heater versus time.

FIG. 7 includes an example graph of conductance 704 of an electric heater versus time 708. Trace 712 tracks the conductance of the electric heater after the heater is turned ON. As shown, the conductance of the electric heater may increase after the electric heater is turned ON until a maximum conductance is reached. After reaching the maximum value, the conductance may decrease.

An updating module 512 monitors the conductance 508 during a use cycle of the electric heater 140 and updates a maximum conductance 516 stored in a maximum module 520 when the conductance 508 increases. For example, the updating module 512 may determine differences between consecutive values of the conductance 508 (e.g., present value of the conductance 508—previous value of the conductance 508) and/or rates of change of the conductance 508 (e.g., present value of the conductance 508—previous value of the conductance 508 divided by the period between the present and previous values).

In the case of differences, the updating module 512 may set the maximum conductance 516 equal to the present value of the conductance 508 when the difference is greater than zero (i.e., positive). In the case of rates of change, the updating module 512 may set the maximum conductance 516 equal to the present value of the conductance 508 when the rate of change is greater than zero. The updating module 512 may leave the maximum conductance 516 unchanged when the difference and/or the rate of change is less than zero.

The maximum conductance 516 corresponds to a maximum value of the conductance 508 of the electric heater 140 during a use cycle of the electric heater 140. A use cycle of the electric heater 140 corresponds to the period between when the electric heater 140 is turned ON and when the electric heater 140 is next turned OFF. The maximum module 520 may reset the maximum conductance 516 for each use cycle. While the examples of identifying the maximum value of the conductance 508 using differences and/or rates of change are provided, the maximum value of the conductance 508 may be determined in another manner and stored for use as the maximum conductance 516. An example of the maximum conductance 516 is indicated by 716 in FIG. 7.

Each time that the updating module 512 updates the maximum conductance 516, the updating module 512 also triggers a timer module 524 to reset a timer value 528. The timer module 524 may increment the timer value 528 as time passes. The timer value 528 therefore tracks the period elapsed since the maximum conductance 516 was last updated.

When the timer value 528 reaches a predetermined value, a fault module 532 determines whether a fault is present in the electric heater 140. In other words, the fault module 532 determines whether the fault is present in the electric heater 140 when a predetermined period has passed since the maximum conductance 516 was last updated (and, therefore, the maximum conductance 516 was found). In addition or alternatively to waiting for the predetermined period, the fault module 532 may determine whether the fault is present in the electric heater 140 when the difference is more negative than a predetermined negative conductance or the rate of change is more negative than a predetermined negative conductance rate of change.

The fault module 532 determines whether the fault is present in the electric heater 140 based on the maximum conductance 516. More specifically, the fault module 532 determines whether the fault is present based on whether the maximum conductance 516 is within or outside of a predetermined conductance range.

The fault module 532 determines that the fault is present when the maximum conductance 516 is greater than a predetermined maximum conductance of the predetermined conductance range or less than a predetermined minimum conductance of the predetermined conductance range. When the maximum conductance 516 is within the predetermined conductance range, the fault module 532 determines that the fault is not present in the electric heater 140. The fault module 532 stores the predetermined DTC 408 in the memory 412 when the fault is present. Examples of the predetermined maximum and minimum conductances are illustrated by 720 and 724, respectively, in FIG. 7.

Figure 6:
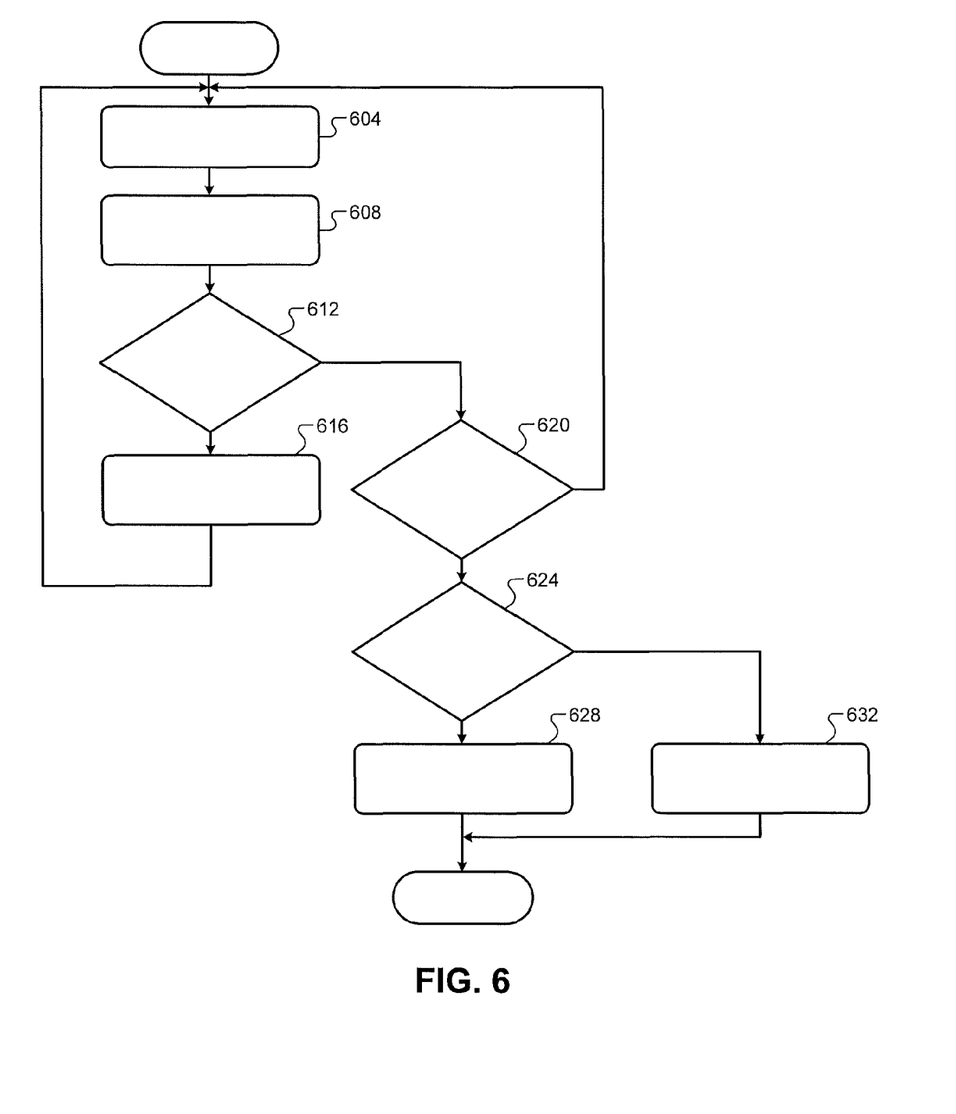
FIG. 6 is a flowchart depicting an example method diagnosing faults in the electric heater.

FIG. 6 includes a flowchart depicting an example method of diagnosing the electric heater 140. Control begins with 602 where the fault module 532 determines whether one or more conditions for performing the fault diagnostic are satisfied. For example, the fault diagnostic module 532 may determine whether the vehicle has been OFF for at least a predetermined period, whether the electric heater 140 has been OFF for at least a predetermined period, and/or whether one or more other conditions are satisfied at 602. If 602 is true, control continues with 604. If 602 is false, control may end without diagnosing whether the fault is present in the electric heater 140.

At 604, the conductance module 504 determines the conductance 508 of the electric heater 140. The conductance module 504 determines the conductance 508 based on the current 224 divided by the voltage 220. At 608, the updating module 512 may determine a difference between the conductance 508 determined at 604 and a last value of the conductance 508 determined when 604 was last performed. For example, the updating module 512 may set the difference to the conductance 508 determined at 604 minus the last value of the conductance 508 determined when 604 was last performed.

The updating module 512 may determine whether the difference is greater than zero at 612. If 612 is false, control continues with 620. If 612 is true, the conductance 508 is increasing, and the updating module 512 sets the maximum conductance 516 to the conductance 608 determined at 604 and resets the timer value 528 at 616, and control continues with 618. While the example of determining the difference and determining whether the difference is greater than zero has been described, additionally or alternatively, the rate of change of the conductance 508 can be determined. The rate of change can be compared with zero, and the maximum conductance 516 could be updated and the timer value 528 could be reset at 616 when the rate of change is greater than zero. At 618, the fault module 532 may determine whether the period since the fault diagnostic began (e.g., when 602 is true) is greater than a predetermined period. If 618 is true, control may continue with 624. If 618 is false, control may return to 604.

At 620, the fault module 532 may determine whether the timer value 528 is greater than the predetermined value. In other words, the fault module 532 may determine whether the predetermined period has passed since the maximum conductance 516 was last updated. If 620 is false, control may transfer to 618. Alternatively, control may return to 604 if 620 is false. If 620 is true, control continues with 624. In addition to or as an alternative to comparing the period elapsed since the maximum conductance 516 was last updated with the predetermined period, the fault module 532 may determine whether the difference is more negative than a predetermined negative conductance or whether the rate of change of the conductance is more negative than the predetermined negative conductance rate of change at 620. The predetermined negative conductance and the predetermined negative conductance rate of change are both negative values.

The fault module 532 determines whether the maximum conductance 516 is within the predetermined conductance range at 624. If 624 is true, namely the maximum conductance 516 is less than the predetermined maximum conductance and greater than the predetermined minimum conductance, the fault module 532 indicates that the fault is not present in the electric heater 140 at 628, and control may end. If 624 is false, the maximum conductance 516 is either greater than the predetermined maximum conductance or less than the predetermined minimum conductance, and the fault module 532 indicates that the fault is present in the electric heater at 632. For example, the fault module 532 may store the predetermined DTC 408 in the memory 412. The monitoring module 416 illuminates the MIL 420 when the fault is present in the electric heater 140. One or more other remedial actions may also be taken when the fault is present in the electric heater 140.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A heater control system for a vehicle, comprising:
    an energy module that determines an amount of energy consumed by an electric heater of a fuel vapor canister since an ignition system of the vehicle was last transitioned from OFF to ON;
    a purge valve control module that controls opening a purge valve while the ignition system of the vehicle is ON, wherein fuel vapor flows from the vapor canister through the purge valve to an air intake system when the purge valve is open; and a heater control module that selectively applies power to the electric heater of the fuel vapor canister and that, based on at least one of the amount of energy consumed by the electric heater and a mass of fuel vapor that has flowed through the purge valve, selectively disconnects the electric heater from the power until after the ignition system is transitioned from ON to OFF.

2. The heater control system of claim 1 wherein, when the amount of energy consumed by the electric heater is greater than a predetermined amount of energy, the heater control module disconnects the electric heater from the power until after the ignition system is transitioned from ON to OFF.

3. The heater control system of claim 1 wherein, when the mass of fuel vapor that has flowed through the purge valve is greater than a predetermined mass, the heater control module disconnects the electric heater from the power until after the ignition system is transitioned from ON to OFF.

4. The heater control system of claim 1 wherein, when both the amount of energy consumed by the electric heater is greater than a predetermined amount of energy and the mass of fuel vapor that has flowed through the purge valve is greater than a predetermined mass, the heater control module disconnects the electric heater from the power until after the ignition system is transitioned from ON to OFF.

5. The heater control system of claim 1 wherein the energy module determines the amount of energy consumed by the electric heater based on a voltage applied to the electric heater and a current through the electric heater.

6. The heater control system of claim 1 further comprising:
a conductance module that determines an electrical conductance of the electric heater; and
a fault module that selectively diagnoses a fault in the electric heater based on a maximum value of the electrical conductance determined between a first time when the power is applied to the electric heater and a second time when the power is disconnected from the electric heater.

7. The heater control system of claim 6 wherein the fault module diagnoses the fault in the electric heater when the maximum value of the electrical conductance is one of:
greater than a first predetermined conductance; and
less than a second predetermined conductance that is less than the first predetermined conductance.

8. The heater control system of claim 7 wherein the fault module diagnoses that the fault is not present in the electric heater when the maximum value of the electrical conductance is both:
less than the first predetermined conductance; and
greater than the second predetermined conductance.

9. The heater control system of claim 6 further comprising a monitoring module that illuminates a malfunction indicator lamp when the fault is diagnosed in the electric heater.

10. The heater control system of claim 6 wherein the fault module sets a predetermined diagnostic trouble code (DTC) associated with the fault in memory when the fault is diagnosed in the electric heater.

11. A heater control method for a vehicle, comprising:
determining an amount of energy consumed by an electric heater of a fuel vapor canister since an ignition system of the vehicle was last transitioned from OFF to ON;
controlling opening a purge valve while the ignition system of the vehicle is ON, wherein fuel vapor flows from the vapor canister through the purge valve to an air intake system when the purge valve is open;
selectively applying power to the electric heater of the fuel vapor canister; and,
based on at least one of the amount of energy consumed by the electric heater and a mass of fuel vapor that has flowed through the purge valve, selectively disconnecting the electric heater from the power until after the ignition system is transitioned from ON to OFF.

12. The heater control method of claim 11 further comprising, when the amount of energy consumed by the electric heater is greater than a predetermined amount of energy, disconnecting the electric heater from the power until after the ignition system is transitioned from ON to OFF.

13. The heater control method of claim 11 further comprising, when the mass of fuel vapor that has flowed through the purge valve is greater than a predetermined mass, disconnecting the electric heater from the power until after the ignition system is transitioned from ON to OFF.

14. The heater control method of claim 11 further comprising, when both the amount of energy consumed by the electric heater is greater than a predetermined amount of energy and the mass of fuel vapor that has flowed through the purge valve is greater than a predetermined mass, disconnecting the electric heater from the power until after the ignition system is transitioned from ON to OFF.

15. The heater control method of claim 11 further comprising determining the amount of energy consumed by the electric heater based on a voltage applied to the electric heater and a current through the electric heater.

16. The heater control method of claim 11 further comprising:
determining an electrical conductance of the electric heater; and
selectively diagnosing a fault in the electric heater based on a maximum value of the electrical conductance determined between a first time when the power is applied to the electric heater and a second time when the power is disconnected from the electric heater.

17. The heater control method of claim 16 further comprising diagnosing the fault in the electric heater when the maximum value of the electrical conductance is one of:
greater than a first predetermined conductance; and
less than a second predetermined conductance that is less than the first predetermined conductance.

18. The heater control method of claim 17 further comprising diagnosing that the fault is not present in the electric heater when the maximum value of the electrical conductance is both:
less than the first predetermined conductance; and
greater than the second predetermined conductance.

19. The heater control method of claim 16 further comprising illuminating a malfunction indicator lamp when the fault is diagnosed in the electric heater.

20. The heater control method of claim 16 further comprising setting a predetermined diagnostic trouble code (DTC) associated with the fault in memory when the fault is diagnosed in the electric heater.

* * * * *